US009020756B2

(12) United States Patent
Abraham et al.

(10) Patent No.: US 9,020,756 B2
(45) Date of Patent: Apr. 28, 2015

(54) METHOD AND APPARATUS FOR PROCESSING SATELLITE POSITIONING SYSTEM SIGNALS

(75) Inventors: Charles Abraham, Los Gatos, CA (US); Donald L. Fuchs, Wyckoff, NJ (US)

(73) Assignee: Global Locate, Inc., San Jose, CA (US)

( * ) Notice: Subject to any disclaimer, the term of this patent is extended or adjusted under 35 U.S.C. 154(b) by 2065 days.

(21) Appl. No.: 10/838,517

(22) Filed: May 4, 2004

(65) Prior Publication Data

US 2005/0080561 A1 Apr. 14, 2005

Related U.S. Application Data

(60) Continuation-in-part of application No. 10/295,332, filed on Nov. 15, 2002, now Pat. No. 6,853,916, which is a continuation of application No. 09/990,479, filed on Nov. 21, 2001, now Pat. No. 6,487,499, which is a
(Continued)

(51) Int. Cl.
*G01S 1/26* (2006.01)
*H04B 1/7075* (2011.01)
(Continued)

(52) U.S. Cl.
CPC .......... *H04B 1/70757* (2013.01); *G01S 5/0036* (2013.01); *G01S 5/0205* (2013.01);
(Continued)

(58) Field of Classification Search
CPC ..... G01S 5/0036; G01S 5/0205; G01S 19/05; G01S 19/235; G01S 19/252; G01S 19/256; G01S 19/258; G01S 19/30; G01S 19/37; G01S 2205/002; H04B 1/7075; H04B 1/70751; H04B 1/70752; H04B 1/70753; H04B 1/70754; H04B 1/70757; H04B 1/7077; H04B 1/70775; H04B 1/708; H04B 2201/70715
USPC ......... 701/213, 207, 214, 215, 216, 217, 220, 701/221, 469, 471, 473, 478; 340/932.2, 340/988; 342/357.06, 358, 422, 357.01, 342/450, 463, 357.1, 357.03, 357.09, 342/357.08, 357.02, 352, 378, 357.12, 342/357.15; 455/457, 561, 524, 575, 422, 455/426, 427, 456; 375/136, 150, 316, 325, 375/340
See application file for complete search history.

(56) References Cited

U.S. PATENT DOCUMENTS

| 4,527,278 A | 7/1985 | Deconche et al. |
|---|---|---|
| 4,785,463 A | 11/1988 | Janc et al. |

(Continued)

FOREIGN PATENT DOCUMENTS

| WO | WO 99/19743 | 4/1999 |
|---|---|---|
| WO | WO 00/14568 | 3/2000 |

(Continued)

OTHER PUBLICATIONS

Kinal et al., INMARSAT Integrity Channels for Gloabal Navigation Satellite System, 1992, IEEE, pp. 22-25.*
(Continued)

*Primary Examiner* — Jerrah Edwards
(74) *Attorney, Agent, or Firm* — Sterne, Kessler, Goldstein & Fox P.L.L.C.

(57) ABSTRACT

Method and apparatus for processing a satellite positioning system (SPS) signal is described. In one example, a timing reference related to a SPS time of day is obtained from a wireless communication signal received by a mobile receiver. A bias in a local clock of the mobile receiver with respect to a frame timing of a repeating code broadcast by the satellite is compensated for in response to the timing reference. An expected code delay window is obtained for the SPS signal at the mobile receiver. The SPS signal is correlated with a reference code within the expected code delay window. In another example, an expected code delay window is obtained at the mobile receiver. The mobile receiver selects a sampling resolution in response to a size of the expected code delay window. The SPS signal is sampled at the selected sampling resolution and then correlated with a reference code.

27 Claims, 6 Drawing Sheets

Related U.S. Application Data continuation of application No. 09/553,930, filed on Apr. 21, 2000, now Pat. No. 6,453,237, application No. 10/838,517, which is a continuation-in-part of application No. 10/359,468, filed on Feb. 5, 2003, which is a continuation of application No. 09/989,625, filed on Nov. 20, 2001, now Pat. No. 6,587,789, which is a division of application No. 09/615,105, filed on Jul. 13, 2000, now Pat. No. 6,411,892, application No. 10/838,517, which is a continuation-in-part of application No. 10/665,703, filed on Sep. 19, 2003, now Pat. No. 7,184,464, which is a division of application No. 09/900,499, filed on Jul. 6, 2001, now Pat. No. 6,704,348, which is a continuation-in-part of application No. 09/861,086, filed on May 18, 2001, now Pat. No. 6,606,346, application No. 10/838,517, which is a continuation-in-part of application No. 09/993,335, filed on Nov. 6, 2001, now Pat. No. 7,053,824.

(60) Provisional application No. 60/130,882, filed on Apr. 23, 1999.

(51) Int. Cl.
 G01S 5/00 (2006.01)
 G01S 5/02 (2010.01)
 G01S 19/23 (2010.01)
 G01S 19/30 (2010.01)
 G06F 17/15 (2006.01)
 G01S 19/05 (2010.01)
 G01S 19/25 (2010.01)
 G01S 19/37 (2010.01)
 H04B 1/7077 (2011.01)

(52) U.S. Cl.
 CPC .............. *G01S 19/05* (2013.01); *G01S 19/235* (2013.01); *G01S 19/252* (2013.01); *G01S 19/256* (2013.01); *G01S 19/258* (2013.01); *G01S 19/30* (2013.01); *G01S 19/37* (2013.01); *G01S 2205/002* (2013.01); *G06F 17/15* (2013.01); *H04B 1/70752* (2013.01); *H04B 1/70754* (2013.01); *H04B 1/7077* (2013.01); *H04B 2201/70715* (2013.01)

(56) References Cited

U.S. PATENT DOCUMENTS

| | | | |
|---|---|---|---|
| 5,090,028 A | 2/1992 | Crebouw | |
| 5,225,842 A | 7/1993 | Brown et al. | |
| 5,365,450 A | 11/1994 | Schuchman et al. | |
| 5,426,665 A | 6/1995 | Cleverly et al. | |
| 5,579,338 A | 11/1996 | Kojima | |
| 5,600,670 A | 2/1997 | Turney | |
| 5,663,734 A | 9/1997 | Krasner | |
| 5,727,018 A | 3/1998 | Wolf et al. | |
| 5,901,171 A | 5/1999 | Kohli et al. | |
| 5,931,893 A | 8/1999 | Dent et al. | |
| 5,945,944 A | 8/1999 | Krasner | |
| 5,966,402 A | 10/1999 | Yamamoto | |
| 6,005,899 A | 12/1999 | Khayrallah | |
| 6,064,336 A | 5/2000 | Krasner | |
| 6,070,078 A * | 5/2000 | Camp et al. | 455/456.2 |
| 6,118,808 A | 9/2000 | Tiemann et al. | |
| 6,181,911 B1 | 1/2001 | Sih et al. | |
| 6,289,041 B1 | 9/2001 | Krasner | |
| 6,298,083 B1 | 10/2001 | Westcott et al. | |
| 6,323,804 B1 | 11/2001 | Kurby et al. | |
| 6,327,473 B1 | 12/2001 | Soliman et al. | |
| 6,363,108 B1 | 3/2002 | Agrawal et al. | |
| 6,369,751 B1 | 4/2002 | Naruse | |
| 6,370,208 B1 | 4/2002 | Kuo et al. | |
| 6,411,892 B1 * | 6/2002 | van Diggelen | 701/207 |
| 6,433,739 B1 | 8/2002 | Soliman | |
| 6,453,237 B1 * | 9/2002 | Fuchs et al. | 701/213 |
| 6,484,097 B2 * | 11/2002 | Fuchs et al. | 701/213 |
| 6,487,499 B1 * | 11/2002 | Fuchs et al. | 701/213 |
| 6,501,420 B2 * | 12/2002 | Townsend et al. | 342/357.1 |
| 6,510,387 B2 * | 1/2003 | Fuchs et al. | 701/213 |
| 6,525,689 B2 * | 2/2003 | Dooley et al. | 342/357.09 |
| 6,526,322 B1 * | 2/2003 | Peng et al. | 700/5 |
| 6,542,820 B2 | 4/2003 | LaMance et al. | |
| 6,560,534 B2 | 5/2003 | Abraham et al. | |
| 6,577,271 B1 | 6/2003 | Gronemeyer | |
| 6,748,202 B2 | 6/2004 | Syrjarinne et al. | |
| 6,775,319 B2 | 8/2004 | King et al. | |
| 6,778,134 B2 * | 8/2004 | Dooley et al. | 342/357.1 |
| 6,795,771 B2 * | 9/2004 | Fuchs et al. | 701/213 |
| 6,804,290 B1 | 10/2004 | King et al. | |
| 6,829,534 B2 * | 12/2004 | Fuchs et al. | 701/213 |
| 6,829,535 B2 | 12/2004 | van Diggelen et al. | |
| 6,853,916 B2 * | 2/2005 | Fuchs et al. | 701/213 |
| 6,891,499 B2 * | 5/2005 | Dooley et al. | 342/357.12 |
| 7,046,194 B2 * | 5/2006 | Dooley et al. | 342/357.15 |
| 7,158,883 B2 * | 1/2007 | Fuchs et al. | 701/213 |
| 7,236,883 B2 * | 6/2007 | Garin et al. | 701/213 |
| 7,239,271 B1 * | 7/2007 | Vyas et al. | 342/357.12 |
| 7,400,974 B2 * | 7/2008 | Fuchs et al. | 701/213 |
| 2001/0017598 A1 * | 8/2001 | Townsend et al. | 342/357.1 |
| 2002/0172267 A1 | 11/2002 | Abraham et al. | |
| 2003/0023379 A1 | 1/2003 | Diggelen et al. | |
| 2003/0069694 A1 | 4/2003 | Fuchs et al. | |
| 2003/0109264 A1 | 6/2003 | Syrjarinne et al. | |
| 2003/0212487 A1 * | 11/2003 | Dooley et al. | 701/213 |
| 2004/0078142 A1 * | 4/2004 | Fuchs et al. | 701/213 |
| 2005/0202829 A1 * | 9/2005 | Onggosanusi et al. | 455/456.1 |

FOREIGN PATENT DOCUMENTS

| | | |
|---|---|---|
| WO | WO 00/59123 | 10/2000 |
| WO | WO 03/010912 | 2/2003 |

OTHER PUBLICATIONS

Davenport, FFT Processing of Direct Sequence Spreading Codes Using Modern DSP Microprocessors, 1991, IEEE, pp. 98-105.*
Smithson et al., The Development of an Operational Satellite Internet Service Provision, 1997, IEEE, pp. 1147-1151.*
Bramley, A vectro processing module for PC Based instrumention, 1990, IEEE, pp. 3/1-3/4.*
International Search Report dated Sep. 16, 2005.
Garin, T.J., et al. "Wireless Assisted GPS-SiRF Architecture and Field Test Results," ION GPS '99, Nashville, TN, pp. 489-497, Sep. 14-17, 1999.
Second Supplemental Report of Dr. Stephen Heppe Regarding Invaldiity of U.S. Patent Nos. 7,158,080, 6,651,000 and 6,704,651, Apr. 8, 2008.
Respondent SiRF Technology, Inc.'s First Supplemental Objections and Responses to Global Locate, Inc.'s First Set of Interrogatories (Nos. 22, 23 and 49) and Exhibits 15-18, Aug. 24, 2007.
Respondent SiRF Technology, Inc.'s Sixth Supplemental Objections and Responses to Global Locate, Inc.'s First Set of Interrogatories (Nos. 19, 21-23, and 27-28), Apr. 3, 2008.
Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 15-18, Aug. 31, 2007.
Respondents' (Mio Technology Limited, USA; MiTAC International Corporation; Pharos Science & Applications, Inc.; E-TEN Information Systems Co. Ltd.) Fifth Supplemental Objections and Responses to Global Locate, Inc.'s First Set of Interrogatories (Nos. 19, 21-23 and 27-28), Apr. 3, 2008.
SiRFstarl Architecture, Product Information, http://www.sirf.com/overview.htm, Apr. 11, 2000.
File History—U.S. Appl. No. 10/081,164, Feb. 22, 2002.
"The Digital Signal Processing Handbook," Section 8.5: Multirate Methods for Running Convolution, pp. 8-12—Aug. 14, 1998.

(56) References Cited

OTHER PUBLICATIONS

Respondent SiRF Technology, Inc.'s First Supplemental Objections and Responses to Global Locate, Inc.'s First Set of Interrogatories (Nos. 22, 23 and 49) and Exhibits 6-7, Aug. 24, 2007.
Respondents' (Mio Technology Limited, USA; MiTAC International Corporation; Pharos Science & Applications, Inc.; E-TEN Information Systems Co. Ltd.) First Supplemental Objections and Responses in Common to Global Locate, Inc.'s First Set of Interrogatories (Nos. 22, 23 and 49) and Exhibits 6-7, Aug. 31, 2007.
Sriram, Sundararajan, et al., "Low-power Correlator Architectures for Wideband CDMA Code Acquisition," Wireless Communications, Texas Instruments, Dallas, Texas, IEEE, pp. 125-129, 1999.
"The Digital Signal Processing Handbook," Section 8.5: Multirate Methods for Running Convolution, pp. 8-12-8-14, 1998.
Expert Report of Stephen Heppe Regarding Invalidity of U.S. patent Nos. 6,417,801, 6,606,346, 6,651,000, 6,704,651, 6,937,187, and 7,158,080, Feb. 25, 2008.
First Supplemental Report of Dr. Stephen Heppe Regarding Invalidity of U.S. Patent Nos. 6,417,801, 6,606,346, 6,937,187 and 7,158,080, Apr. 4, 2008.
Melbourne, W.G., et al. "Scientific Applications of GPS on Low Earth Orbiters," Jet Propulsion Laboratory, California Institute of Technology, http://hdl.handle.net/2014/32419, 1994.
Young, L., et al. "GPS Precision Orbit Determination: Measured Receiver Performance," Jet Propulsion Laboratory, California Institute of Technology, http://hdl.handle.net/2014/35887, 1993.
Chansarkar, M., et al. "Acquisition of GPS Signals at Very Low Signal to Noise Ratio," ION NTM 2000, Anaheim, CA, pp. 731-737, Jan. 26-28, 2000.
Lamance, J., et al. "Assisted GPS—Low Infrastructure Approach," GPS World, vol. 13, No. 3, pp. 46-51, Mar. 2002.
Spilker Jr., J.J., et al. "Overview of GPS Operation and Design," Global Positioning System: Theory and Applications vol. I, Progress in Astronautics and Aeronautics, vol. 163, Ch. 2, pp. 29-55, 1996.
Aparicio., M., et al. "GPS Satellite and Payload," Global Positioning System: Theory and Applications vol. I, Progress in Astronautics and Aeronautics, vol. 163, Ch. 6, pp. 209-244, 1996.
File History—U.S. Appl. No. 10/081,164, filed Feb. 22, 2002.
Yiu, K., et al. "A Low-Cost GPS Receiver for Land Navigation," Global Positioning System, Hewlett-Packard Laboratories, Palo Alto, CA, pp. 44-60, May 1982.
Initial Determination, Certain GPS Devices and Products Containing Same, United States International Trade Commission Investigation No. 337-TA-602, Public Version, Nov. 25, 2008.
Rebuttal Expert Report of Michael S. Braasch, Ph.D., P.E., Regarding Validity of U.S. Patent No. 6,606,346, Redacted—Non-Confidential Version, Mar. 10, 2008.
Respondents' Notice of Prior Art, Certain GPS Devices and Products Containing Same, United States International Trade Commission Investigation No. 337-TA-602, Feb. 15, 2008.
Respondents' First Supplemental Corrected Notice of Prior Art, Certain GPS Devices and Products Containing Same, United States International Trade Commission Investigation No. 337-TA-602, Mar. 4, 2008.
Complainants' Notice of Prior Art Pursuant to Ground Rule 5, Certain GPS Devices and Products Containing Same, United States International Trade Commission Investigation No. 337-TA-602, Feb. 15, 2008.
Commission Investigative Staff's Notice of Prior Art, Certain GPS Devices and Products Containing Same, United States International Trade Commission Investigation No. 337-TA-602, Feb. 15, 2008.
Wolfert, S. et al. "Rapid Direct P(Y)-Code Acquisition in a Hostile Environment," Software Technology and Systems, Sensors Directorate, Air Force Research Lab, pp. 353-360, Sep. 15-18, 1998.
Lyusin, S., et al. "Fast Acquisition by Matched Filter Technique for GPS/GLONASS Receivers," Magellan Corp. Moscow Dev. Center, pp. 307-315, Sep. 15-18, 1998.
Namgoong, W., et al., "An All-Digital IF GPM Synchronizer for Portable Applications," in Digest of Technical Papers of the 1999 IEEE International Solid-State Circuits Conference, 1999 San Francisco, CA, pp. 340-341, 476.
Complainants' First Amended Complaint under Section 337 of the Tariff Act of 1930, as Amended, Certain GPS Devices and Products Containing Same, United States International Trade Commission Investigation No. 337-TA-602, Feb. 8, 2008.
Commission Opinion, Certain GPS Devices and Products Containing Same, United States International Trade Commission Investigation No. 337-TA-602, Jan. 27, 2009.
*SiRF v. Broadcom*, U.S. Court of Appeals for the Federal Circuit, 2009-1262, decided Apr. 12, 2010.

* cited by examiner

METHOD AND APPARATUS FOR PROCESSING SATELLITE POSITIONING SYSTEM SIGNALS

CROSS-REFERENCE TO RELATED APPLICATIONS

This application is a continuation-in-part of the following U.S. patent applications:

(1) U.S. patent application Ser. No. 10/295,332, filed Nov. 15, 2002, now U.S. Pat. No. 6,853,916 which is a continuation of U.S. patent application Ser. No. 09/990,479, filed Nov. 21, 2001 (now U.S. Pat. No. 6,487,499), which is a continuation of U.S. patent application Ser. No. 09/553,930, filed Apr. 21, 2000 (now U.S. Pat. No. 6,453,237), which claims priority to U.S. provisional patent application No. 60/130,882, filed Apr. 23, 1999;

(2) co-pending U.S. patent application Ser. No. 10/359,468, filed Feb. 5, 2003, which is a continuation of U.S. patent application Ser. No. 09/989,625, filed Nov. 20, 2001 (now U.S. Pat. No. 6,587,789), which is a divisional of U.S. patent application Ser. No. 09/615,105, filed Jul. 13, 2000 (now U.S. Pat. No. 6,411,892);

(3) U.S. patent application Ser. No. 10/665,703, filed Sep. 19, 2003, now U.S. Pat. No. 7,184,464 which is a divisional of U.S. patent application Ser. No. 09/900,499, filed Jul. 6, 2001 (now U.S. Pat. No. 6,704,348), which is a continuation-in-part of U.S. patent application Ser. No. 09/861,086, filed May 18, 2001 (now U.S. Pat. No. 6,606,346);

(4) U.S. patent application Ser. No. 09/993,335, filed Nov. 6, 2001 now U.S. Pat. No. 7,053,824.

Each of the aforementioned patent applications, patents, and provisional application are incorporated by reference herein in their entireties.

BACKGROUND OF THE INVENTION

1. Field of the Invention

The present invention relates to signal correlators for digital signal receivers and, more particularly, to a method and apparatus processing satellite positioning system signals in a mobile receiver.

2. Description of the Background Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by performing a series of correlations between the incoming signals and internally generated PN signal sequences (also referred to as reference codes or PN reference codes). For each incoming signal, the correlation process can be lengthy, as both the time delay and the exact frequency of the signal are unknown. To test for the presence of a signal, the receiver is tuned to a particular frequency, and the incoming signal is correlated with the PN reference code having a particular code shift corresponding to a time delay. If no signal is detected, the PN reference code is shifted and the correlation is repeated for the next possible time delay. To find a given signal, receivers traditionally conduct a two dimensional search, checking each delay possibility over a range of frequencies. In addition, each individual correlation is typically performed over one or more milliseconds in order to allow sufficient signal averaging to distinguish the signal from the noise. Because many thousands frequency and time delay possibilities are checked, the overall acquisition process can take tens of seconds.

The measured time delays produced by the correlation process are referred to as "sub-millisecond pseudoranges", since they are known modulo the 1 millisecond PN frame boundaries. By resolving the integer number of milliseconds associated with each measured time delay, then one has true, unambiguous pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time" or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

In some GPS applications, the signal strengths of the satellite signals are so low that either the received signals cannot be processed, or the time required to process the signals is excessive. Detecting attenuated signals requires each correlation to be performed over a relatively long period of time. For example integration may be performed over a few seconds, as opposed to the 1-10 millisecond period used in traditional GPS receivers. The two dimensional sequential search process employed by traditional receivers becomes impractical at such long integration times, because the overall search time increases by a factor of 100 or more. Moreover, the pseudoranges measured by the process may be inaccurate, since the receiver performs the correlations at a coarse spacing, such as one-half chip, for example.

To accelerate the search process, GPS designers add additional correlators to the receiver so that multiple time delay possibilities can be checked simultaneously. Typically, each correlator that is added requires a separate code mixer and signal accumulator. For a given sensitivity level, this decreases search times in proportion to the number of correlators. To achieve the sensitivity and acquisition time demanded in low signal-to-noise ratio environments, the design might have to incorporate many thousands of correlators. This addition is typically prohibitively complex and expensive for a consumer class device.

Therefore, there exists a need in the art for improved, low cost processing of satellite positioning system signals in a mobile receiver.

SUMMARY OF THE INVENTION

A method and apparatus for processing a satellite positioning system signal is described. In one embodiment, a timing reference related to a satellite positioning system time of day is obtained from a wireless communication signal received by a mobile receiver. A bias in a local clock of the mobile receiver with respect to a frame timing of a repeating code broadcast by the satellite is compensated for in response to the timing reference. An expected code delay window is obtained for the satellite positioning system signal at the mobile receiver. The satellite positioning system signal is correlated with a reference code within the expected code delay window. The timing reference allows the mobile receiver to substantially compensate for the local clock bias associated with correlator circuitry used to measure code delays to satellite positioning signals. In one embodiment, the timing reference is combined with expected pseudorange data to determine the expected code delay window over which the satellite signals are correlated. In another embodiment, the timing reference is further compensated to account for the distance of the mobile receiver from a wireless base station.

In another embodiment, an expected code delay window is obtained at the mobile receiver. The mobile receiver selects a sampling resolution in response to a size of the expected code delay window. The satellite positioning system signal is sampled at the selected sampling resolution. The sampled satellite positioning system signal is correlated with a reference code. In one embodiment, a higher sampling resolution is selected when the size of the code delay window satisfies a threshold, which enables more accurate code delay measurements.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

A method and apparatus for processing a satellite positioning system signal in a mobile receiver is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals.

Figure 1:
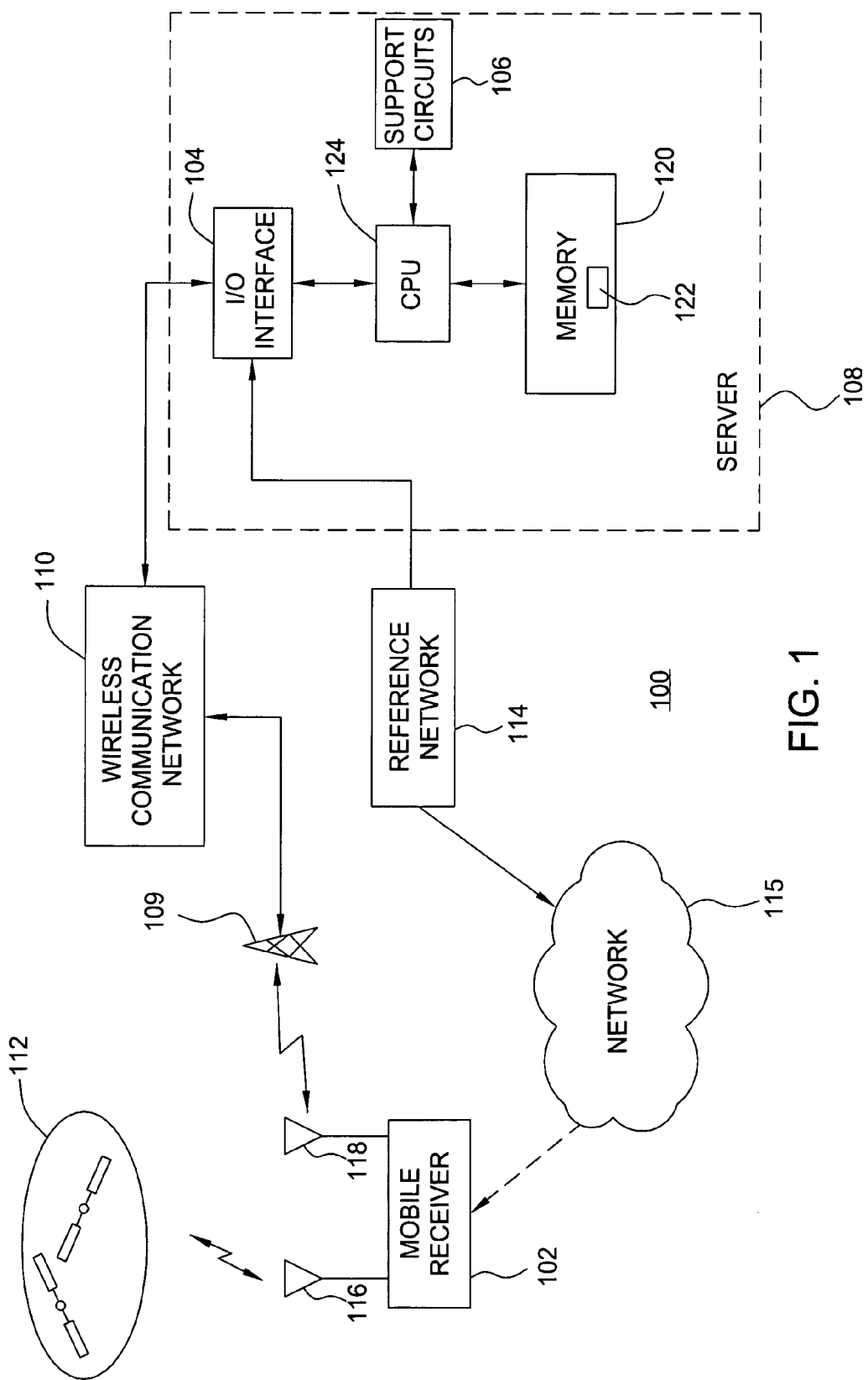
FIG. 1 is a block diagram depicting an exemplary embodiment of a position location system.

FIG. 1 is a block diagram depicting an exemplary embodiment of a position location system 100. The system 100 comprises a mobile receiver 102 in communication with a server 108 via a wireless communication network 110. The mobile receiver 102 is configured for communication with the server 108 over a communication link between an antenna 118 and a base station 109 of the wireless communication network 110. The wireless communication network 110 may comprise a cellular communication network having a plurality of base stations or cell sites, including the base station 109. The server 108 may be disposed in a serving mobile location center (SMLC) of the wireless communication network 110. The mobile receiver 102 is configured to receive satellite signals from a plurality of satellites 112 via an antenna 116. The mobile receiver 102 processes the received satellite signals to produce satellite measurement data (e.g., pseudoranges, Doppler measurements).

Satellite navigation data, such as ephemeris for at least the satellites 112, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108. Upon request, the server 108 may transmit satellite trajectory data (e.g., ephemeris, almanac, or some other satellite trajectory model) to the mobile receiver 102. Alternatively, the mobile receiver 102 may receive satellite trajectory data (e.g., ephemeris, almanac, or some other satellite trajectory model) via a communications network 115 (e.g., a computer network, such as the Internet). Notably, the satellite trajectory data may comprise a long term satellite trajectory model, as described in commonly-assigned U.S. Pat. No. 6,560,534, issued May 6, 2003, which is incorporated by reference herein in its entirety.

In one embodiment, the mobile receiver 102 sends the satellite measurement data to the server 108 along with a time-tag. The server 108 receives satellite navigation data for at least the satellites 112 from the reference network 114. The server 108 locates position of the mobile receiver 102 using the satellite measurement data and the satellite navigation data (referred to as the mobile station assisted or "MS-assisted" configuration). In another embodiment, the mobile receiver 102 obtains satellite trajectory data from either the server 108 or the communications network 115. The mobile receiver 102 locates its own position using the satellite measurement data and the trajectory data (referred to as the mobile station based or "MS-based" configuration). In yet another embodiment, the mobile receiver 102 may locate its own position by decoding satellite navigation message from the satellite signals, rather than receiving the satellite trajectory data from an external source (referred to as the autonomous configuration).

In any configuration, the mobile receiver 102 may use satellite signal acquisition assistance data ("acquisition assistance data") to assist in acquiring satellite signals and obtaining satellite measurement data. Acquisition assistance data may be computed using satellite trajectory data (e.g., ephemeris or other satellite trajectory model) and an approximate position of the mobile receiver 102. An approximate position of the mobile receiver 102 may be obtained using various position estimation techniques known in the art, including use of transitions between base stations of the wireless communication network 110, use of a last known location of the mobile receiver 102, use of a location of the base station 109 in communication with the mobile receiver 102, use of a location of the wireless communication network 110 as identified by a network ID, or use of a location of a cell site of the wireless communication network 110 in which the mobile receiver 102 is operating as identified by a cell ID.

The acquisition assistance data includes expected pseudorange data. In one embodiment of the invention, the acquisition assistance data includes expected pseudoranges from the satellites 112 to an assumed position of the mobile receiver 102 (approximate position) at an assumed time-of-day. The expected pseudoranges may be computed using the satellite trajectory data. The details of such computations are well known in the art and, for purposes of clarity, are not repeated herein. The expected pseudoranges may be computed by the server 108 and transmitted to the mobile receiver 102 upon request. Alternatively, if the mobile receiver 102 has obtained satellite trajectory data, the mobile receiver 102 may compute the expected pseudoranges.

In one embodiment, the expected pseudoranges are derived from a model that is valid over specified period of time ("pseudorange model"). The mobile receiver 102 may apply a time-of-day to the pseudorange model to extract appropriate expected pseudorange parameters. Exemplary processes for forming pseudorange models as acquisition assistance data are described in commonly-assigned U.S. Pat. No. 6,453,237, issued Sep. 17, 2002, which is incorporated by reference herein in its entirety. A pseudorange model may be formed by the server 108 and transmitted to the mobile receiver 102 upon request. Alternatively, if the mobile receiver 102 has obtained satellite trajectory data, the mobile receiver 102 may form the pseudorange model.

In one embodiment, the acquisition assistance data may be formatted as described in ETSI TS 101 527 (3GPP TS 4.31), which is shown below in Table 1. Notably, the acquisition assistance data defined in 3GPP TS 4.31 may include a satellite vehicle identifier (SVID), zeroth and first order Doppler terms, a Doppler uncertainty, an expected code phase (e.g., sub-millisecond pseudorange), an integer code phase, a code phase search window, and expected azimuth and elevation data. The range of possible values and associated resolutions are shown for each of the parameters.

TABLE 1

| Parameter | Range | Resolution |
|---|---|---|
| SVID/PRNID | 1–64 (0–63) | n/a |
| Doppler ($0^{th}$ order term) | −5,120 Hz to 5,117.5 Hz | 2.5 Hz |
| Doppler ($1^{st}$ order term) | −1–0.5 | n/a |
| Doppler Uncertainty | 12.5 Hz–200 Hz [$2^{-n}(200)$ Hz, n = 0–4] | n/a |

TABLE 1-continued

| Parameter | Range | Resolution |
|---|---|---|
| Code Phase | 0–1022 chips | 1 chip |
| Integer Code Phase | 0–19 | 1 C/A period |
| GPS Bit number | 0–3 | n/a |
| Code Phase Search Window | 1–192 chips | n/a |
| Azimuth | 0–348.75 deg | 11.25 deg |
| Elevation | 0–78.75 deg | 11.25 deg |

The server 108 illustratively comprises an input/output (I/O) interface 104, a central processing unit (CPU) 124, support circuits 106, and a memory 120. The CPU 124 is coupled to the memory 120 and the support circuits 106. The memory 120 may be random access memory, read only memory, removable storage, hard disc storage, or any combination of such memory devices. The support circuits 106 include conventional cache, power supplies, clock circuits, data registers, I/O interfaces, and the like to facilitate operation of the server 108. The I/O interface 104 is configured to receive satellite navigation data from the reference network 114. The I/O interface 104 is also configured for communication with the wireless communication network 110. Various processes and methods described herein may be implemented using software 122 stored in the memory 120 for execution by the CPU 124. Alternatively, the server 108 may implement such processes and methods in hardware or a combination of software and hardware, including any number of processors independently executing various programs and dedicated hardware, such as application specific integrated circuits (ASICs), field programmable gate arrays (FPGAs), and the like.

The base station 109 is configured to broadcast a time synchronization signal to enable the mobile receiver 102 to synchronize to the base station 109 as a first step in establishing communication with the wireless communication network 110. The time synchronization signal includes a timing message that is related to GPS time. The timing message may be related absolutely to GPS time (e.g., the timing message may be a system time message) or may be related to a sub-millisecond portion of GPS time (e.g., the timing message may be a frame number and information relating the frame number to UPS time). In either case, information from the time synchronization signal may be used to establish a timing reference for the mobile receiver 102.

For example, the base station 109 may employ a separate synchronization channel for broadcasting a time message that contains the system time relative to timing markers in the synchronization channel. The system time may be equivalent to GPS time or may have some known relationship to GPS time. The mobile receiver 102 may derive the system time from the time synchronization signal and determine a timing reference related to GPS time. The timing reference may be used to calibrate clock circuits within the mobile receiver 102, or may be used to establish a time offset between such clock circuits and GPS time. In one embodiment, the timing reference is further compensated to account for the distance of the mobile receiver 102 from the base station 109. This compensation makes use of a measurement of the round trip signal delay between base station 109 and the mobile receiver 102. In this manner, the mobile receiver 102 may be synchronized to GPS time.

An exemplary cellular communication network that employs such a timing synchronization signal is the North American CDMA (code division multiple access) standard (IS-95). The IS-95 system employs a separate 26.67 millisecond synchronization channel that is spread using a PN sequence of $2^{15}$ chips. Additionally, the synchronization channel is modulated with a particular Walsh code, allowing it to be separated from paging and traffic channels using different Walsh codes. The synchronization channel carries a message containing a time of day relative to the frame boundaries of the synchronization channel ("CDMA system time"). The CDMA system time is precisely related to UPS time. In one embodiment, to accurately determine GPS time from the CDMA system time, the CDMA time obtained from the synchronization channel is adjusted to remove an offset that is added by the delay in the transmission of the CDMA system time from the base station 109 to the mobile receiver 102. This adjustment is made by measuring the round-trip delay for a signal being transmitted from the mobile receiver 102 to the base station 109 and back. The synchronization channel structure for the IS-95 CDMA system is well known in the art. For purposes of clarity by example, aspects of the invention are described with respect to an IS-95 CDMA system. It is to be understood, however, that the invention may be used with other types of synchronized cellular communication networks that provide time synchronization signals, such as CDMA-2000, W-CDMA, and the like.

The present invention may also be used with non-synchronized cellular communication systems that include a mechanism for relating a non-synchronized system time to GPS time, such as global system for mobile communication (GSM), universal mobile telecommunications system (UMTS), North American time division multiple access (TDMA) (e.g., IS-136), and personal digital cellular (PDC) networks. For example, in a GSM system, the time synchronization signal comprises a synchronization burst periodically transmitted by the base station 109 and a timing message that provides a GSM time stamp associated with the synchronization burst. In some GSM networks, USM time is not synchronized to GPS time. However, such networks may include location measurement units (LMUs). As well known in the art, an LMU includes a GPS receiver, which is used to receive and decode time information (TOW) from the satellites in view of one or more base stations. The LMU then computes an offset value between GPS time and the time as known by the base station(s) that are near the LMU ("air-interface timing"). The offset is provided to the base station(s) for use in relating the air-interface timing to GPS time. Notably, the base station 109 may transmit an offset between its air-interface timing and UPS time to the mobile receiver 102. For example, the offset may be supplied to the mobile receiver 102 as part of an acquisition assistance data exchange as defined in 3GPP TS 4.31.

As described below, the invention may synchronize to the frame timing of the PN codes broadcast by the UPS satellites using the timing reference derived from a time synchronization signal of a wireless network. This allows the mobile receiver 102 to substantially compensate for the local clock bias associated with the correlator circuitry used to measure the code delays. Then, using expected pseudorange data, the mobile receiver 102 may derive an expected code delay window over which the satellite signals may be correlated. In this manner, the invention substantially reduces the time required to detect the satellite signals, as well as increases the accuracy of the satellite measurement data.

Figure 2:
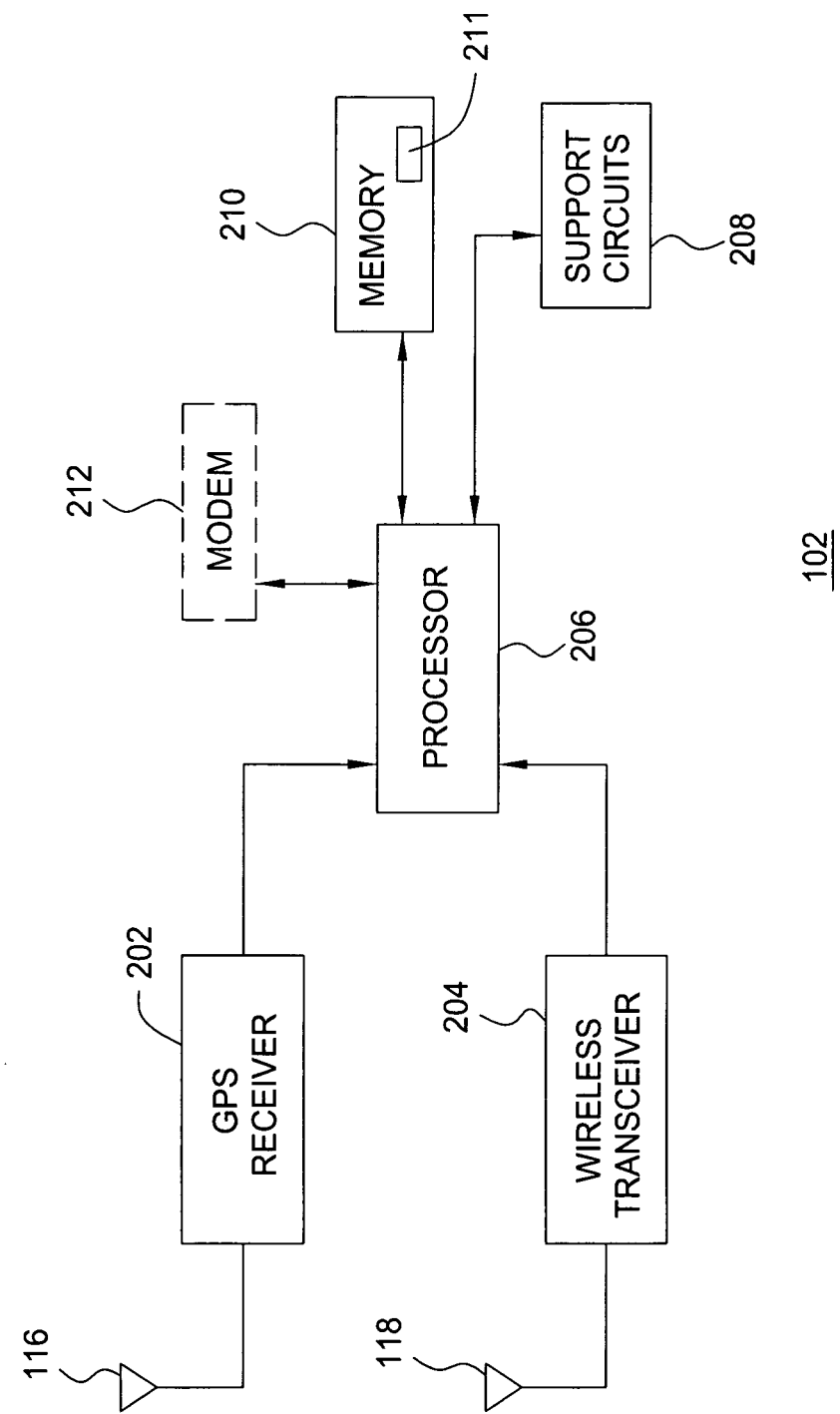
FIG. 2 is a block diagram depicting an exemplary embodiment of a mobile receiver constructed in accordance with the invention.

FIG. 2 is a block diagram depicting an exemplary embodiment of the mobile receiver 102 of FIG. 1. The mobile receiver 102 illustratively comprises a GPS receiver 202, a wireless transceiver 204, a processor 206, a memory 210, and support circuits 208. The GPS receiver 202 processes satellite signals received by the antenna 116. An exemplary embodiment of the GPS receiver 202 is described below with respect to FIG. 3. The wireless transceiver 204 processes a wireless signal (e.g., a cellular signal) received by the antenna 118. The GPS receiver 202 and the wireless transceiver 204 are controlled by the processor 206. The mobile receiver 102 may include a modem 212 or other type of communications transceiver for receiving data (e.g., satellite trajectory data) from a separate communications link, such as the Internet.

The processor 206 may comprise a microprocessor, instruction-set processor (e.g., a microcontroller), or like type processing element known in the art. The processor 206 is coupled to the memory 210 and the support circuits 208. The memory 210 may be random access memory, read only memory, removable storage, hard disc storage, or any combination of such memory devices. The support circuits 208 include conventional cache, power supplies, clock circuits, data registers, I/O interfaces, and the like to facilitate operation of the mobile receiver 102. Various processes and methods described herein may be implemented using software 211 stored in the memory 210 for execution by the processor 206. Alternatively, the mobile receiver 102 may implement such processes and methods in hardware or a combination of software and hardware, including any number of processors independently executing various programs and dedicated hardware, such as ASICs, FPGAs, and the like.

Notably, in an IS-95 CDMA compatible environment, the wireless transceiver 204 detects a pilot channel of a nearby base station (e.g., the base station 109 of FIG. 1) and then proceeds to decode a synchronization channel broadcast by the base station. The wireless transceiver 204 achieves synchronization to the framing of the synchronization channel and receives a time message containing a time of day relative to the frame boundaries. Since the time of day derived from the synchronization channel is related to GPS time used by the GPS satellites, the processor 206 may derive a timing reference related to GPS time. The timing reference may be further compensated for the round-trip delay of a signal communicated between the wireless transceiver 204 and the base station 109. The processor 206 provides the timing reference to the GPS receiver 202 as a reference signal. In a GSM compatible environment, the mobile receiver 102 receives a time offset from the base station 109 that relates the air-interface timing of the base station 109 to GPS time. The wireless transceiver 204 achieves synchronization to the framing of the GSM signal and receives a GSM time message containing a time of day relative to the frame boundaries. The processor 206 derives a timing reference related to GPS time using the time offset between the air-interface timing and UPS time. The processor 206 provides the timing reference to the GPS receiver 202 as a reference signal. In either the CDMA or GSM environments, the UPS receiver 202 may use the reference signal to precisely track UPS time, typically to within a few microseconds.

Figure 3:
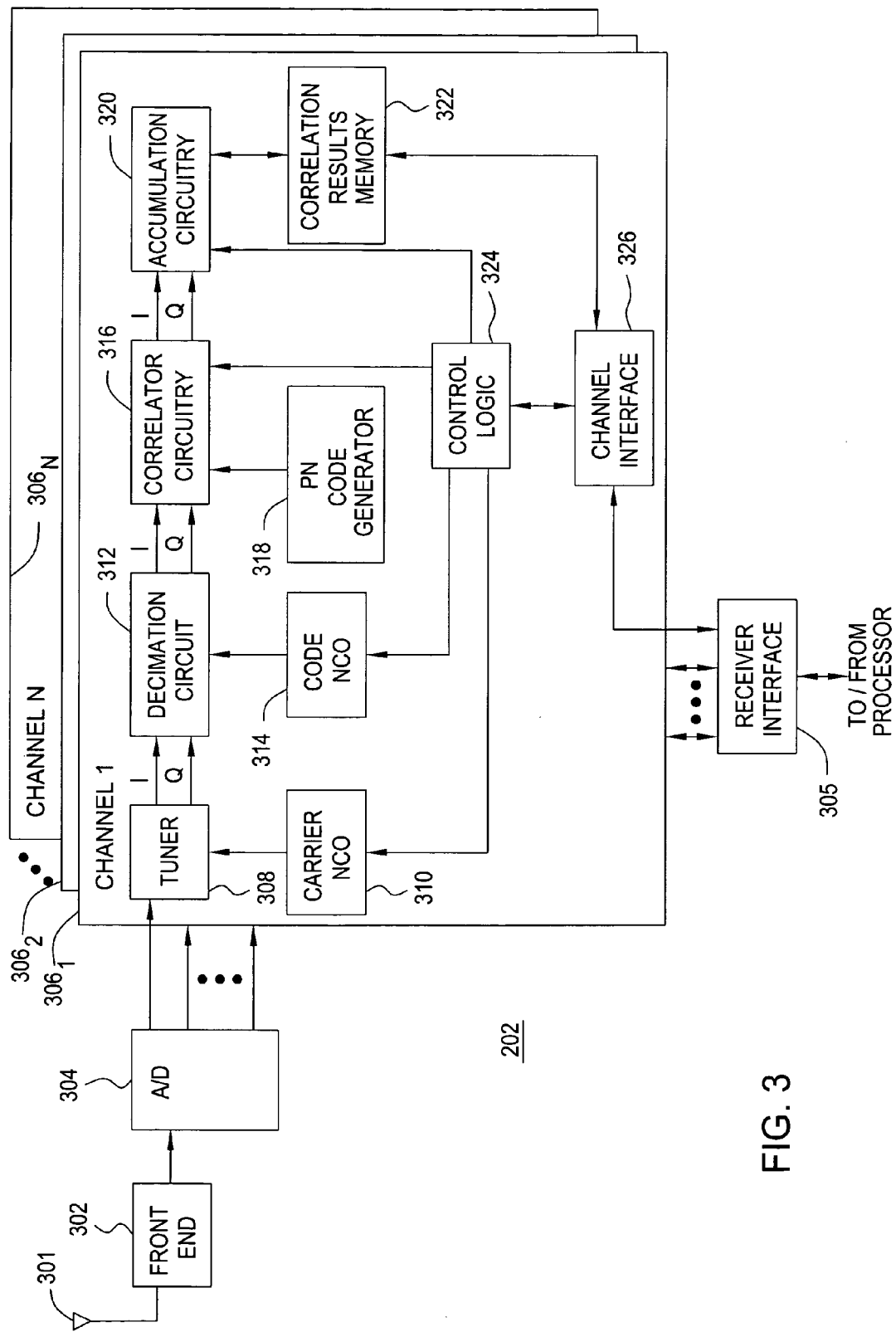
FIG. 3 is a block diagram depicting an exemplary embodiment of a GPS receiver constructed in accordance with the invention.

FIG. 3 is a block diagram depicting an exemplary embodiment of the UPS receiver 202 of FIG. 2. The UPS receiver 202 illustratively comprises a front end 302, an analog-to-digital (A/D) converter 304, a receiver interface, and a set of processing channels $306_1$ through $306_N$ (collectively referred to as processing channels 306), where N is an integer. For purposes of clarity by example, only the processing channel $306_1$ is shown in detail. Those skilled in the art will appreciate that the processing channels $306_2$ through $306_N$ are identical to the processing channel $306_1$.

GPS signals are received by the antenna 116. The front end 302 filters, amplifies, and frequency shifts the UPS signals in a well-known manner for digitization by the A/D converter 304. Outputs of the A/D converter 304 are respectively coupled to each of the processing channels 306. The receiver interface 305 includes a bus configured to communicate with external circuitry (e.g., the processor 206), and a bus configured to communicate with each of the processing channels 306.

Each of the processing channels 306 comprises a tuner 308, a carrier numerically controlled oscillator (NCO) 310, a decimation circuit 312, a code NCO 314, correlator circuitry 316, a PN code generator 318, accumulation circuitry 320, correlation results memory 322, and control logic 324. Each of the processing channels 306 may be used to process a signal from a particular satellite. The tuner 308 is driven by the carrier NCO 310 to digitally tune a particular satellite signal. The tuner 308 may serve two purposes. First, the tuner 308 may remove any intermediate frequency component remaining after processing by the front end 302. Second, the tuner 308 may compensate for any frequency shift resulting from satellite motion, user motion, and reference frequency errors. The tuner 308 outputs baseband signal data comprises an in-phase component (I) and a quadrature component (Q).

The decimation circuit 312 processes the I and Q data from the tuner 308 to produce a series of complex signal samples with I and Q components in accordance with a sampling rate determined by the code NCO 314. In general, the sampling rate of the decimation circuit 312 may be selected to produce P samples per chip of the satellite signal PN code, where P is an integer greater than zero. In this manner, the GPS receiver 202 may operate in multiple modes of resolution. For example, in a standard resolution mode, the decimation circuit 312 may produce digital signal samples having two samples per PN code chip (i.e., the samples are spaced at ½ of a PN code chip or P=2). In a high-resolution mode, the decimation circuit 312 may produce digital signal samples having five samples per PN code chip (i.e., the samples are spaced at ⅕ of a PN code chip or P=5). Those skilled in the art will appreciate that other values for the sample spacing may be employed and that the GPS receiver 202 may operate in more than two modes of resolution.

The parallel correlator is intended to operate on a full pn code cycle of the input waveform. These cycles are nominally one millisecond in length, but will vary due to doppler shift and local clock rate errors. Left uncompensated, the effect of this variation would be a slight shift in the correlation result each millisecond, which would lead to a significant "blurring" of the convolution results that are averaged over hundreds of milliseconds.

To compensate this effect, the input sample rate is adjusted to properly match the pseudo range rate due to doppler. The effect of this variable rate sampling is to spread or compress the input data such that the parallel correlator will always hold exactly one full cycle of the input. In this manner, convolution results will remain stationary across the accumulation interval, yielding a sharp peak free of the blurring effect described above.

The variable sampling rate scheme is achieved through a re-sampling mechanism. Input samples are initially digitized at a high rate. The input is then individually re-sampled at a lower rate for each channel. The re-sampling rate for each channel is determined by a NCO programmed to the predicted pseudo range rate for the channel.

On an instantaneous basis, the re-sampling process can not generate perfectly spaced samples since the time resolution of the overall sampling process is set by the initial high speed digitization. Over longer periods, however, the average sample rate is correct which is adequate to ensure good correlation results.

The correlator circuitry 316 processes the I and Q samples from the decimation circuit 312. The correlator circuitry 316 correlates the I and Q signals with an appropriate PN code generated by the PN code generator 318 for the particular satellite signal. An exemplary embodiment of the correlator circuitry 316 is described below with respect to FIG. 4. The I and Q correlation results are accumulated with other I and Q correlation results by the accumulation circuitry 320 and are stored in the correlation results memory 322. The accumulation process is referred to as signal integration and is used to improve signal-to-noise ratio of the correlation results. Notably, the accumulation circuitry 320 may accumulate I and Q correlation results for a time period associated with one or more epochs of the PN code. For example, the 1 and Q correlation results may be accumulated over a one millisecond interval (i.e., one PN code epoch) or over a multiple millisecond interval (e.g., 10 PN code epochs or 10 milliseconds). This process is referred to as coherent integration and the associated time period is referred to as a coherent integration interval.

The coherent integration interval is limited by several factors, including uncompensated Doppler shift, 180 degree phase transitions caused by the navigation data bits, and phase shifts induced by motion of the mobile receiver 102. These factors introduce slow, but seemingly random phase variations into the signals. Over many tens of milliseconds, these phase changes cause destructive interference that defeats the purpose of coherent integration. Thus, to achieve long averaging intervals, the accumulation circuitry 320 may perform a secondary step of magnitude accumulation (also referred to as non-coherent integration).

The carrier NCO 310, the code NCO 314, the correlator circuitry 316, and the accumulation circuitry 320 are controlled by the control logic 324. The control logic 324 may receive various configuration parameters via the receiver and channel interfaces 305 and 326 (e.g., parameters generated by a processing device, such as the processor 206 in the mobile receiver 102). For example, the configuration parameters may include one or more of the desired tuning frequency of the carrier NCO 310, the desired mode of resolution for the decimation circuit 312 (e.g., standard resolution mode or high-resolution mode), the desired coherent and non-coherent integration periods, and the desired timing reference and code delay window data for the correlator circuitry. Alternatively, one or more of such configuration parameters may be generated by the control logic 324. The control logic 324 may implement the desired mode of resolution through control of the code NCO 314. For a detailed understanding of the GPS receiver 202 and the components discussed above, the reader is referred to commonly-assigned. U.S. Pat. No. 6,704,348, issued Mar. 9, 2004, which is incorporated by reference herein in its entirety.

Figure 4:
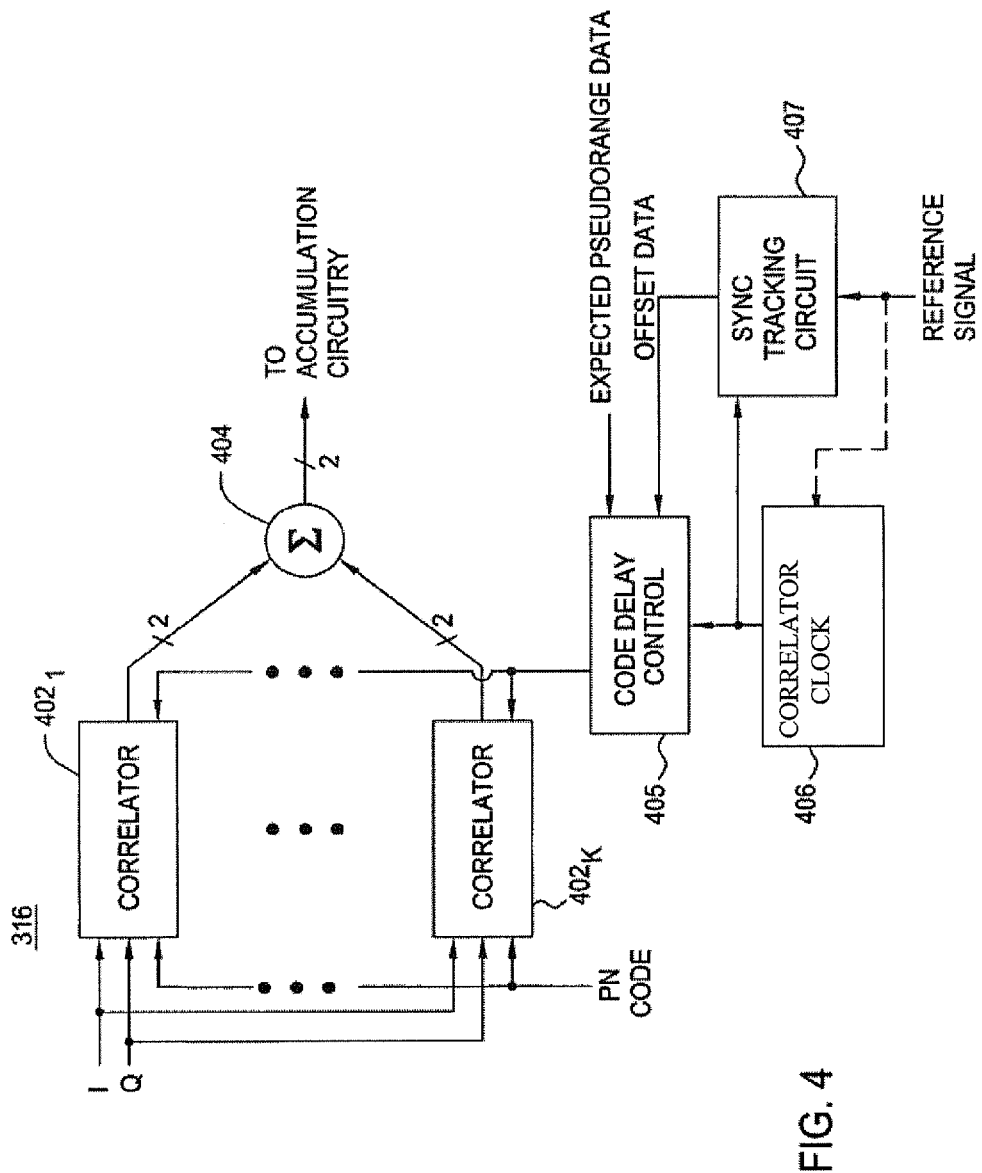
FIG. 4 is a block diagram depicting an exemplary embodiment of correlation circuitry constructed in accordance with the invention.

FIG. 4 is a block diagram depicting an exemplary embodiment of the correlator circuitry 316 of FIG. 3. In one embodiment, the correlator circuitry 316 comprises an adder 404, a correlator clock 406 (also referred to as a "local clock"), a code delay control circuit 405, a sync tracking circuit 407, and a set of correlators $402_1$ through $402_K$ (collectively referred to as correlators 402), where K is an integer greater than zero. Each of the correlators 402 is configured to receive the I and Q samples from the decimation circuit 312. Each of the correlators 402 is configured to produce a correlation between the input I and Q signals and a PN reference code. The PN reference code is successively delayed in time amongst the correlators 402 (i.e., the incoming samples are correlated with K replicas of the PN code). The code delay of the PN code for each of the correlators 402 is controlled by the code delay control circuit 405. The code delay control circuit 405 controls the code delay for each of the correlators 402 using a clock signal from the correlator clock 406 and expected pseudorange data.

In one embodiment, the sync tracking circuit 407 receives a reference signal that provides a timing reference related to GPS time (e.g., a reference signal derived from a time synchronization signal of a cellular network). As described above, the reference signal may be used to precisely track UPS time, typically to within a few microseconds. The correlator clock 406 may comprise a free-running (i.e., non-synchronized) clock. The sync tracking circuit 407 keeps track of the offset (error) between the reference signal and the timing of the correlator clock 406. The sync tracking circuit 407 supplies an offset signal to the code delay control circuit 405. In this manner, the code delay control circuit 405 can account for any error in the timing of the correlator clock 406. In another embodiment, the correlator clock 406 may comprise a steerable clock circuit. Rather than employing the sync tracking circuit 407, the timing of the correlator clock 406 may be directly controlled using the reference signal. In general, a bias in the correlator clock 406 with respect to the frame timing of the satellite PN codes is compensated for using the reference signal.

With the compensation of local clock bias, the code delay control circuit 405 may correctly center an expected code search window in order to detect the incoming signal. The expected code search window is formed using the expected pseudorange data. Notably, a sub-millisecond portion of the expected pseudorange data relates to the expected code phase offset at which the PN reference code and the incoming signal will be aligned. As is well known in the art, the particular one of the correlators 402 having the input signal and PN reference code aligned will have a high correlation output with respect to all other correlators 402. The adder 404 sums I and Q correlation results, which are supplied to the accumulation circuitry 320.

Figure 5:
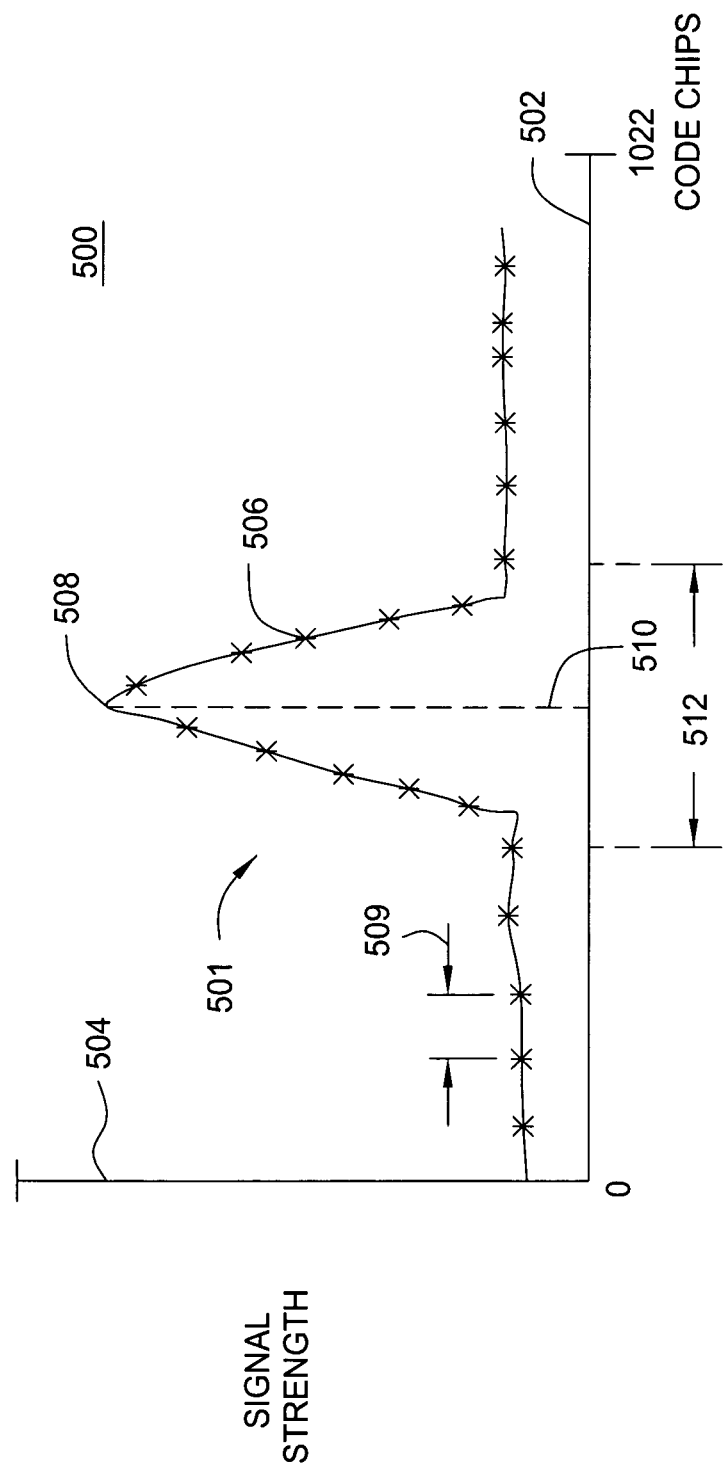
FIG. 5 is a graph illustrating an exemplary embodiment of a correlation response for an entire PN frame.

FIG. 5 is a graph 500 illustrating an exemplary correlation response 501 over a PN frame. An axis 502 represent code chips, and an axis 504 represents signal strength. Points on the chip axis 502 are spaced at an interval equal to the PN code chip length divided by the number of samples per chip (P). The correlation response 501 represents a sequence of correlation points 506 at every possible time delay (also referred to as a convolution). The number of correlation points 506 in the correlation response 501 is a function of the number of samples per chip. For example, if P=2, then the correlation response 501 includes 2046 correlation points. As is apparent from the graph 500, as the samples per chip increase (i.e., the resolution increases), the number of correlation points 506 in the correlation response 501 increases (e.g., by a factor of 1023 for every integer increase in P).

The correlation response 501 illustratively includes a peak 508 at a time delay 510. The time delay 510 corresponds to the time delay of the PN reference code that results in the greatest alignment with the incoming signal samples. As is apparent from the graph 500, the more samples per chip (i.e., the higher the resolution), the more accurate the time delay measurement becomes. For example, a resolution of two samples per chip provides a sample spacing 509 of approximately 500 nanoseconds, which corresponds to a range difference of 150 meters. A resolution of five samples per chip provides a sample spacing 509 of approximately 200 nanoseconds, which corresponds to a range difference of 60 meters. Thus, it is clear that an increase in resolution provides for a more accurate delay measurement and hence a more accurate pseudorange measurement.

Referring to FIGS. 4 and 5, to detect the peak 508, the correlators 402 must process a sufficient number of code delays in the vicinity of the peak 508, illustrated by the code delay window 512. For example, the correlators 402 may compute a full convolution such that all possible code delays are processed. If there are two samples per chip, and a full convolution is to be computed at once, then 2046 correlators are required for each of the I and Q signals (4092 total correlators). If the sample spacing is increased to five samples per chip, then 5,115 correlators are required for each of the I and Q signals (10,230 total correlators) to compute a full convolution at once. Power consumption and circuit size restrictions may make a correlator circuit having 10,230 or even 4092 correlators per channel impractical.

If the code delay window 512 is known before correlation begins, then the correlators 402 may compute only the correlations within the code delay window 512. As described below, the invention advantageously employs an expected code delay window and a timing reference related to GPS time to time the correlation process such that the correlators 402 compute only the correlations within the code delay window 512. In this manner, since only a subset of the full convolution is computed at once for each processed code epoch, either the number of correlators 402 may be reduced or the sampling resolution may be increased, as desired, depending upon the accuracy, power consumption, and circuit size constraints.

Figure 6:
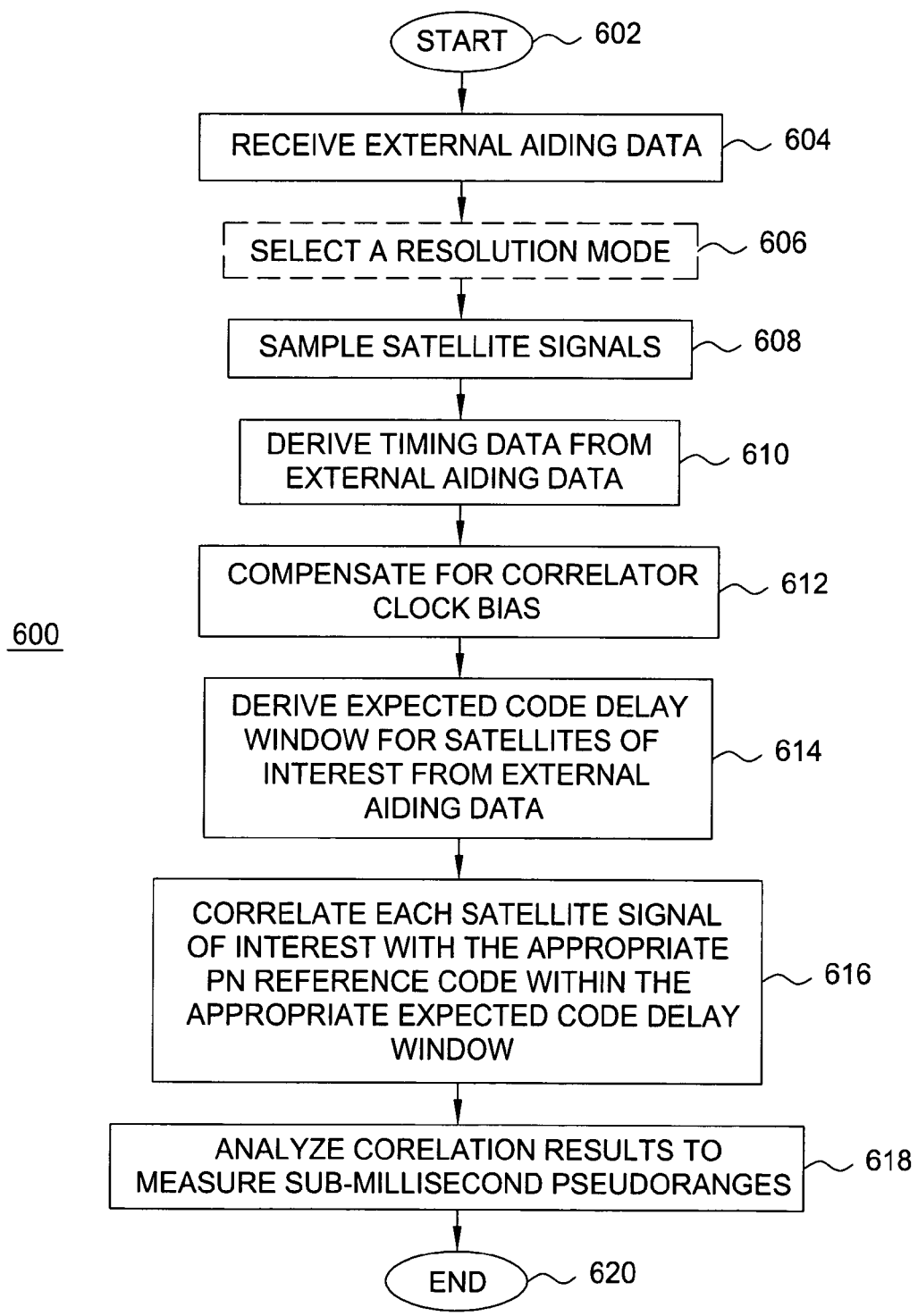
FIG. 6 is a flow diagram depicting an exemplary embodiment of a method for processing a satellite positioning system signal in accordance with the invention.

FIG. 6 is a flow diagram depicting an exemplary embodiment of a method 600 for processing a satellite positioning system signal in accordance with the invention. The method 600 begins at step 602. At step 604, external aiding data is received at the mobile receiver 102. The external aiding data includes information that may be used to derive a timing reference related to GPS time and expected code delay windows for satellites of interest. For example, the external aiding data may include a time synchronization signal broadcast by a base station of a wireless communication network, as well as acquisition assistance data provided by an external source (e.g., a server). Alternatively, the external aiding data may include a time synchronization signal broadcast by a base station of a wireless communication network, as well as satellite trajectory data (e.g., ephemeris) provided by either an external source or by the satellites. As described above, the satellite trajectory data may be used to compute acquisition assistance data given an estimated position of the mobile receiver. Whether the acquisition data is computed or received from an external source, the acquisition assistance data includes expected pseudorange data (e.g., expected pseudoranges, expected code phases, pseudorange models, and the like). The expected pseudorange data may be used to establish expected code delay windows for satellite signals of interest.

At optional step 606, the mobile receiver 102 may select a resolution mode. In one embodiment, the mobile receiver 102 may select a resolution mode for a particular channel of the GPS receiver based on the size of an expected code delay window with respect to a predefined threshold. The predefined threshold may be determined in accordance with hardware limitations (e.g., the number of correlators per channel in the GPS receiver). The resolution mode may be selected on a channel-by-channel basis. For example, if a given expected code delay window is less than 110 chips, than a particular channel in the GPS receiver may be configured in a high-resolution mode (e.g., 110 chips at five I samples and five Q samples per chip). Otherwise, the particular channel may be configured in a normal resolution mode.

At step 608, satellite signals are received and sampled by the mobile receiver 102. The satellite signals are sampled at a sampling resolution set by the mobile receiver 102. At step 610, a timing reference is derived from a time synchronization signal in the external aiding data. At step 612, a correlator clock bias within the mobile receiver 102 is compensated for using the timing reference. Without the timing reference, the timing of the correlator circuitry within the mobile receiver 102 is arbitrary relative to the timing of the satellite PN codes, which yields an unknown local clock bias. Since the timing reference is related to GPS time, the correlator clock bias may be estimated or the correlator clock may be substantially synchronized to the frame timing of the satellite PN codes. In this manner, an uncertainty component of the measured time delay caused by an unknown relative timing of the correlator circuitry is substantially reduced or eliminated. It is to be understood, however, that the timing reference may not be completely accurate. To achieve the best accuracy, the delay between the mobile receiver 102 and the base station 109 may be taken into account, as discussed above (e.g., a round-trip travel time between the mobile receiver 102 and the base station 109 may be measured when deriving the timing reference). A remaining uncertainty component of the measured time delay is related to the unknown pseudorange and any error in the timing reference with respect to GPS time.

At step 614, expected code delay windows for satellites of interest are derived from the external aiding data. The expected code delay windows account for the uncertainty component of the measured time delay related to the unknown pseudorange. Notably, the expected code delay window is based on an expected pseudorange for each satellite of interest. At step 616, each satellite signal of interest is correlated with the appropriate PN reference code within the appropriate expected code delay window derived at step 614. Since the correlator clock bias is compensated, and expected code delay windows have been determined, the mobile receiver 102 may correlate over substantially less than a full epoch of the PN code. As discussed above, this allows the mobile receiver 102 to employ less correlators and/or increase the sampling resolution. At step 618, the correlation results produced at step 616 may be analyzed to measure sub-millisecond pseudoranges to the satellites of interest. The sub-millisecond pseudoranges may be used to locate position of the mobile receiver 102 in a well known manner. The method 600 ends at step 620.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to illustrative embodiments of the present invention, other and further embodiments of the invention may be devised without departing from the basic scope thereof, and the scope thereof is determined by the claims that follow.

What is claimed is:

1. A mobile receiver, comprising:
    a processor configured to obtain an expected code delay window based on an expected pseudorange for a satellite; and
    a satellite signal receiver configured to receive a satellite positioning system signal broadcast by said satellite, to select a sampling rate in response to a size of said expected code delay window and a predicted pseudo range rate, to sample said satellite positioning system signal at said selected sampling rate, and to correlate said sampled satellite positioning system signal with a reference code; and
    accumulation circuitry configured to perform magnitude accumulation on said satellite positioning system signal within said expected code delay window.

2. The mobile receiver of claim 1, further comprising:
    a communications device configured to receive external aiding data at said mobile receiver;
    wherein said processor is configured to obtain said expected code delay window in response to said external aiding data.

3. The mobile receiver of claim 2, wherein said communications device comprises a wireless transceiver configured to receive a wireless communication signal containing said external aiding data.

4. The mobile receiver of claim 2, wherein said external aiding data comprises a time synchronization signal, and wherein said satellite signal receiver is further configured to compensate for a bias in a local clock in response to said time synchronization signal.

5. The mobile receiver of claim 2, wherein said external aiding data comprises acquisition assistance data.

6. The mobile receiver of claim 2, wherein said external aiding data comprises satellite trajectory data.

7. The mobile receiver of claim 1, wherein the processor receives the expected code delay window from an external ground-based transceiver.

8. The mobile receiver of claim 7, wherein said external ground-based transceiver forms a portion of a cellular telephone network.

9. The mobile receiver of claim 3, wherein the wireless communication signal is a broadcast signal.

10. The mobile receiver of claim 9, wherein the wireless communication signal is broadcast on a dedicated control channel.

11. A mobile receiver, comprising:
    a satellite signal receiver configured to obtain an expected code delay window based on an expected pseudorange for a satellite, to receive a satellite positioning system signal broadcast by said satellite, to select a sampling rate in response to a size of said expected code delay window and a predicted pseudo range rate, to sample said satellite positioning system signal at said selected sampling rate, and to correlate said sampled satellite positioning system signal with a reference code; and
    accumulation circuitry configured to perform magnitude accumulation on said satellite positioning system signal within said expected code delay window.

12. The mobile receiver of claim 11, further comprising:
    a communications device configured to receive external aiding data at said mobile receiver;
    wherein said expected code delay window is obtained in response to said external aiding data.

13. The mobile receiver of claim 12, wherein said communications device comprises a wireless transceiver configured to receive a wireless communication signal containing said external aiding data.

14. The mobile receiver of claim 12, wherein said external aiding data comprises a time synchronization signal, and wherein said satellite signal receiver is further configured to compensate for a bias in a local clock in response to said time synchronization signal.

15. The mobile receiver of claim 12, wherein said external aiding data comprises acquisition assistance data.

16. The mobile receiver of claim 12, wherein said external aiding data comprises satellite trajectory data.

17. The mobile receiver of claim 11, wherein the satellite signal receiver receives the expected code delay from an external ground-based transceiver.

18. The mobile receiver of claim 17, wherein said external ground-based transceiver forms a portion of a cellular telephone network.

19. The mobile receiver of claim 13, wherein the wireless communication signal is a broadcast signal.

20. The mobile receiver of claim 19, wherein the wireless communication signal is broadcast on a dedicated control channel.

21. A mobile receiver, comprising:
a satellite signal receiver configured to obtain a predicted pseudo range rate for a satellite, to receive a satellite positioning system signal broadcast by said satellite, to select a sampling rate in response to the predicted pseudo range rate, to sample said satellite positioning system signal at said selected sampling rate, and to correlate said sampled satellite positioning system signal with a reference code; and
accumulation circuitry configured to perform magnitude accumulation on said satellite positioning system signal within said expected code delay window.

22. The mobile receiver of claim 21, further comprising:
a communications device configured to receive external aiding data at said mobile receiver.

23. The mobile receiver of claim 22, wherein said external aiding data comprises an expected code delay window.

24. The mobile receiver of claim 23, wherein the satellite signal receiver is further configured to select the sampling rate in response to said expected code delay window.

25. The mobile receiver of claim 22, wherein said communications device comprises a wireless transceiver configured to receive a wireless communication signal containing the external aiding data.

26. The mobile receiver of claim 22, wherein said external aiding data comprises a time synchronization signal, and wherein said satellite signal receiver is further configured to compensate for a bias in a local clock in response to said time synchronization signal.

27. The mobile receiver of claim 22, wherein said external aiding data comprises satellite trajectory data.

* * * * *